No. 872,451. PATENTED DEC. 3, 1907.
S. A. REEVE.
CLEARANCE CONTROLLING MECHANISM FOR COMPRESSORS AND MOTORS.
APPLICATION FILED JULY 16, 1902.

2 SHEETS—SHEET 1.

No. 872,451. PATENTED DEC. 3, 1907.
S. A. REEVE.
CLEARANCE CONTROLLING MECHANISM FOR COMPRESSORS AND MOTORS.
APPLICATION FILED JULY 16, 1902.

2 SHEETS—SHEET 2.

Witnesses.
Adeline C. Ratigan
E. Batchelder

Inventor.
Sidney A. Reeve
by Wright, Brown & Quinby
Attys

UNITED STATES PATENT OFFICE.

SIDNEY A. REEVE, OF WORCESTER, MASSACHUSETTS, ASSIGNOR TO CHARLES F. BROWN, TRUSTEE, OF READING, MASSACHUSETTS.

CLEARANCE-CONTROLLING MECHANISM FOR COMPRESSORS AND MOTORS.

No. 872,451.      Specification of Letters Patent.      Patented Dec. 3, 1907.

Application filed July 16, 1902. Serial No. 115,813.

*To all whom it may concern:*

Be it known that I, SIDNEY A. REEVE, of Worcester, in the county of Worcester and State of Massachusetts, have invented certain new and useful Improvements in Clearance-Controlling Mechanisms for Compressors and Motors, of which the following is a specification.

This invention relates broadly to cylinder and piston apparatus and also includes in its operation such devices as fluid compressors and explosion motors, the object of the invention being to provide improved means for controlling the cylinder clearance of apparatus of this kind.

The invention consists primarily in a clearance-controlling mechanism embodying a body of liquid in a clearance chamber in connection with the working cylinder, together with improved means for varying the level of said liquid whereby the volume open to the reception of gases may be varied.

The invention also consists in improved mechanism for securing such variation automatically in a compressor, explosion motor or other cylinder and piston apparatus.

Figure 1:
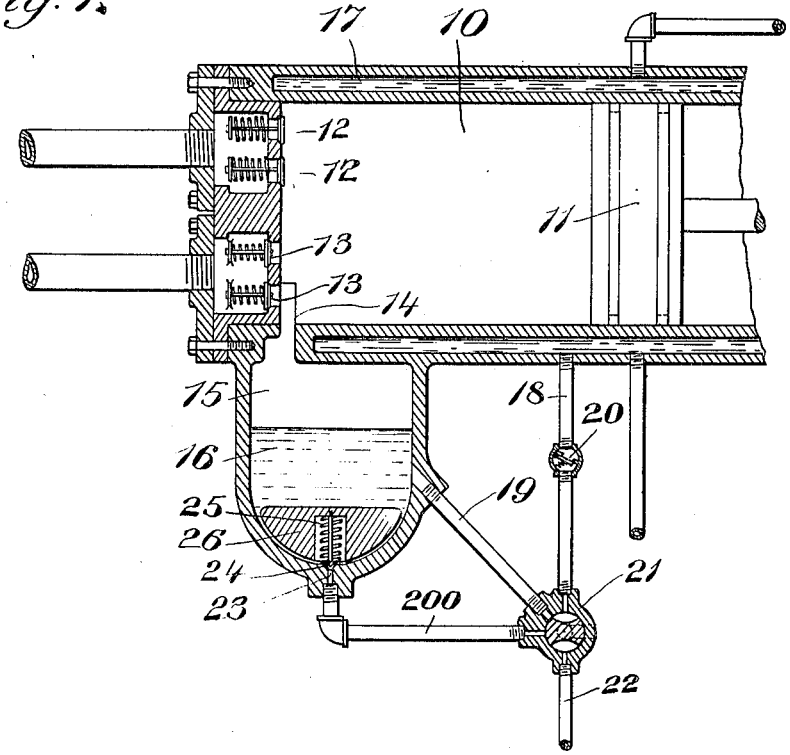
Figure 2:
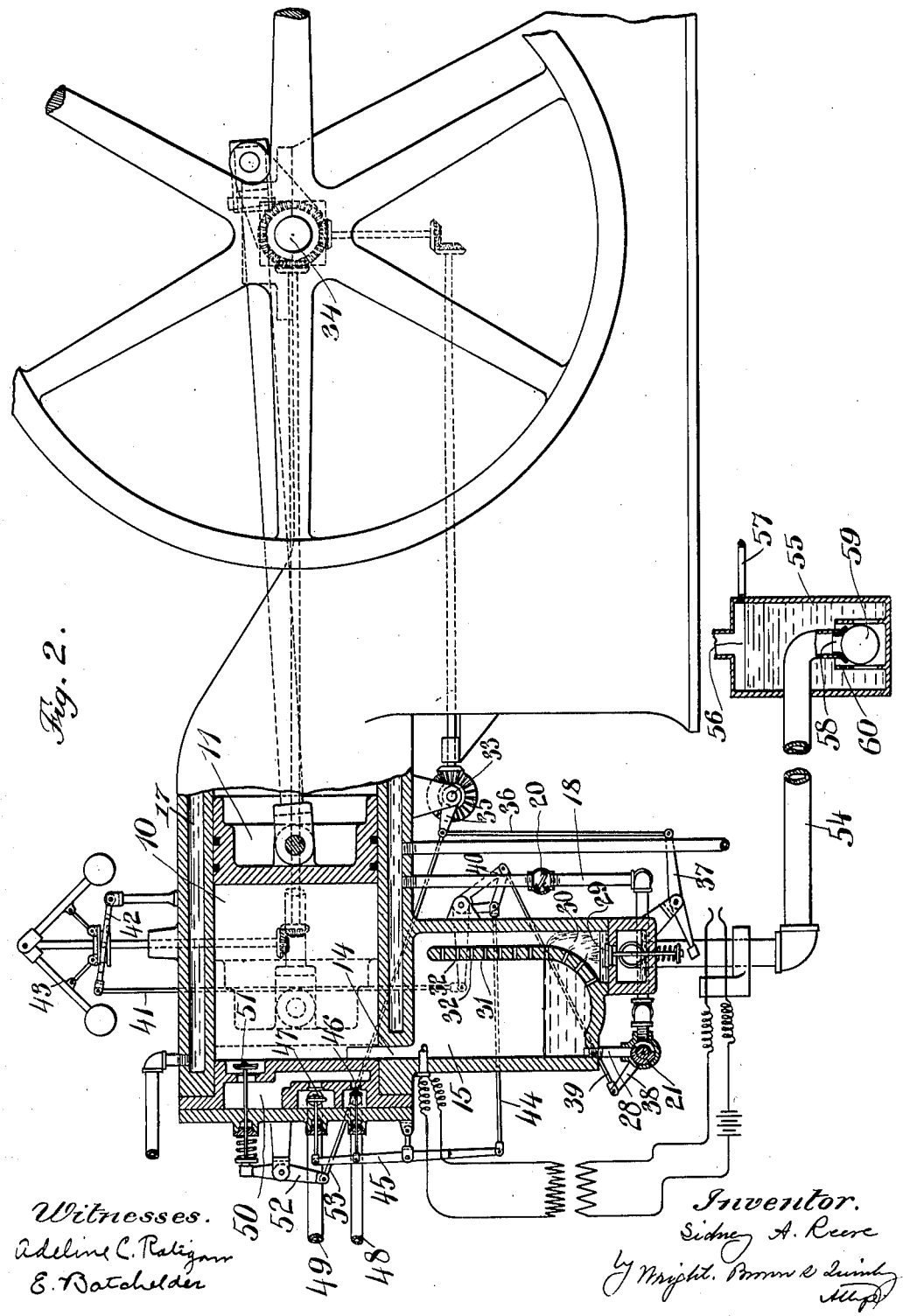

Of the accompanying drawings,—Figure 1 represents a longitudinal section of one end of a compressor cylinder provided with clearance-controlling means constructed in accordance with my invention. Fig. 2 represents a longitudinal vertical section of an explosion motor embodying my invention.

The same reference characters indicate the same parts in all the figures.

Referring at first to Fig. 1, 10 represents the working cylinder of a compressor having a reciprocating piston 11 and suitable inlet and exhaust-valves 12 13. In connection with said cylinder through a passage-way 14 is a compression or clearance chamber 15 adapted to contain a body of liquid 16 which may be water received by said chamber from the water-jacket 17 of the cylinder 10 through pipes 18 19. In the pipe 18 is a check-valve 20 opening away from the water-jacket and at the junction of the pipes 18 19 is a four-way cock 21. The cock also controls an outlet pipe 200 leading from the chamber 15 and a waste-pipe 22. The cock has a position in which it connects pipes 18 19, permitting water to flow into the chamber 15, another position in which it connects pipes 200 22, permitting water to leave said chamber, and a third or neutral position shown in Fig. 1 in which it shuts off all flow. The water outlet 23 of the chamber 15 is controlled by a valve 24 normally pressed open by a spring 25 but adapted to be closed by a "float" 26 which may be of hollow or solid metal whose immersed weight is insufficient to overcome the tension of spring 25 but will close the valve 24 before all the water has escaped from chamber 15. This valve arrangement prevents the escape of any of the gaseous contents of chamber 15 through the outlet 23. The valve 21 is preferably speed-controlled as hereinafter described in connection with Fig. 2. It is evident that by manipulating said valve the level of the water in chamber 15 may be varied by causing the water to flow into or out of said chamber. I am thereby enabled to vary the clearance or compression space existing behind the piston when the latter is at the inner end of its stroke. Such variation in an ordinary compressor results in a change in the quantity of gaseous fluid admitted at a suction stroke.

A further useful embodiment of my invention is illustrated in Fig. 2, in which I have shown the hereinbefore-described clearance-controlling device applied to a four-cycle explosion engine and automatically controlled in accordance with the speed of the engine. 10 is the working cylinder, 11 the piston, 15 the clearance or compression chamber receiving water from the jacket 17 through a pipe 18 containing a downwardly-opening check-valve 20. 21 is a plug-valve placed at the junction of the pipe 18 with a conduit 28 leading from the valve casing into the chamber 15. 29 is the exhaust-valve of the engine located at the bottom of a vertical passage 30 separated by a partition or dike 31 from the chamber 15, with which said passage 30 connects over the top of said partition and through a series of small holes 32 32 in the partition. The vertical extent or distribution of these holes is greater than their combined aperture in a horizontal direction, so that the water has to rise to a considerable height in order to greatly increase its outlet. The valve 29 is operated from a shaft 33 driven at half speed from the main shaft 34 of the engine, through a crank 35, rod 36 and lever 37 engaging the valve-stem. The valve 21 is oscillated through connections including arm 38, rod 39, lever 40, rod 41 and lever 42 by a centrifugal governor operated from the main shaft 34, the arrangement being such that as the speed of the engine decreases, the valve 21 tends to shut off the supply of water to chamber 15 while an increase of speed increases the supply. Connection is also made from lever 40 by rod 44 and lever 45 with the stems of two valves 46 47 controlling respectively the admission of gas and air from supply conduits 48 49 to a chamber 50 from whence the mixture is admitted to the cylinder through an admission valve 51 operated by lever 52 and rod 53 from the half-speed crank 35. The valves 46 47 are thus automatically governed so as to increase the quantity of air and gas admitted to the cylinder upon a decrease in the speed of the engine and to decrease the admission upon an increase in speed. In the method heretofore employed of varying the charge to suit the load without varying the cylinder clearance, there is a loss of efficiency; for it is well known that the maximum efficiency of an explosion engine is only attained under fixed conditions as to degree of compression. With my clearance-controlling mechanism, however, when the speed of the engine increases and the charge is diminished to correspond with the decreased call for power, the valve 21 admits a greater quantity of water to the chamber 15 than was admitted under the previous speed. The water in said chamber, which before had a certain level determined by the relation between the amount of opening of valve 21 and the aggregate resultant flow through the outlet holes 32 covered by the water, is now, owing to the greater amount of opening of said valve, raised to a higher level in the chamber 15 and finds a more rapid outlet through a greater aggregate area of holes. The raising of the water-level decreases the cylinder clearance by an amount which by proper design may be easily made to correspond to the decrease in the amount of explosive charge admitted to the cylinder. The compression therefore becomes the same as before and the efficiency remains more nearly constant under different loads than with the former system of regulation by varying charge without varying clearance. Upon a decrease in the speed of the engine the valves 46 47 admit an increased charge while the valve 21 has a smaller opening and admits a decreased quantity of water to the chamber 15 so that the level falls in said chamber and increases the clearance to correspond to the increased charge. The end of the exhaust pipe 54 is carried a considerable distance to a trap 55 having a gas outlet 56 and a water outlet 57 both located above the level of the exhaust outlet 58. In this trap the water and exhaust gases passing the exhaust valve 29 have an opportunity to separate and escape through their respective outlets, and the noise of the exhaust is effectively muffled. The outlet 58 of pipe 54 is controlled by a float valve 59 working in an apertured guide 60. The first sharp puff of the exhaust displaces the valve 59 and the main body of the exhaust escapes through the trap. Owing, however, to the cooling of the pipe 54 by the passage of water through it, there ensues a decreased pressure of the remaining hot gases of the exhaust, accompanied by a closing of the valve 59 and a partial vacuum is created in said pipe 54. The valves 29 and 51 being open at this moment, the residue of burned gases in the cylinder is accordingly scavenged therefrom and its place taken by fresh charge. By reason of the presence of the water in contact with the exhaust gases, much of the heat from the gases goes into a lower-temperature form, and a part becomes latent. Hence the outlet 56 gives off a mixture of steam and exhaust gases, which can be employed for any useful purpose to which it may be found adapted. The accretions of water to the pool in vessel 55, which in this case come from the clearance chamber of the explosion cylinder, are kept from accumulating to an uncertain depth by the overflow 57, which maintains a constant depth of water over the outlet of the exhaust pipe and therefore a constant slight back-pressure at the first instant of exhaust. In this way the exhaust and the transformation of its heat are placed under control.

It will be understood that I have not attempted to illustrate all of the possible embodiments of my invention, nor do I confine myself to the details of construction described and illustrated in the foregoing embodiments.

I claim:—

1. In an explosion motor, the combination of a working cylinder having a clearance-chamber, means for supplying a clearance-varying liquid thereto, and means for automatically varying the admission of said liquid according to the load on the motor.

2. In an explosion motor, the combination of a working cylinder having a clearance-chamber, means for supplying a clearance-varying liquid thereto, and means controlled by the speed of the motor for varying the admission of said liquid.

3. The combination of a cylinder having a clearance-chamber, a conduit for supplying said chamber with a clearance-varying liquid, valve-mechanism in said conduit controlling the flow of said liquid, and speed-controlled means for adjusting said valve-mechanism.

4. In an explosion motor, the combination of a working cylinder having a clearance-chamber, a conduit for admitting a clearance-varying liquid to said chamber, conduit connections for supplying the cylinder with combustion charges, and speed-controlled means for varying the quantity of each charge admitted and for directly varying the admission of said liquid.

5. In an explosion motor, the combination of a working cylinder having a clearance-chamber, means for admitting combustion charges to said cylinder, means for admitting a clearance-varying liquid to said chamber, an exhaust-and-discharge outlet from said chamber for releasing both the combustion products and the liquid, and valve-mechanism mechanically controlled by the motor and controlling said outlet.

6. In an explosion motor, the combination of a working cylinder having a clearance-chamber in two sections, means for admitting combustion charges to said cylinder, means for admitting a clearance-varying liquid to one section of said chamber, and means for releasing the liquid by gravity therefrom to the other section.

7. The combination of a cylinder, a clearance space or chamber therefor, a partition dividing said space into two portions and formed with an orifice, a liquid-inlet to one of said portions, and a liquid-outlet from the other portion.

8. The combination of a cylinder, a clearance space or chamber therefor, and a partition dividing said space into two sections and formed with an outlet from one of said sections to the other extended over a vertical distance greater than the horizontal aperture of the outlet.

9. In an explosion motor, the combination of a working cylinder, a clearance space or chamber therefor, means to supply a liquid to said chamber, an exhaust conduit arranged to receive the gaseous exhaust and liquid drainage from said chamber and cylinder, and a liquid trap associated with the outlet of said conduit.

10. In an explosion motor, the combination of a working cylinder, a clearance space or chamber therefor, means to supply a liquid to said chamber, an exhaust conduit arranged to receive the gaseous exhaust and liquid drainage from said chamber and cylinder, a liquid trap associated with the outlet of said conduit, and a float valve in said trap controlling said outlet.

11. In an explosion-motor the combination of a combustion chamber, means for admission of combustion charges and neutral liquid thereto, an outlet from the lower part of said chamber for the burned gases and accumulated liquid, and an exhaust-valve operated by the motor and controlling said outlet.

In testimony whereof I have affixed my signature, in presence of two witnesses.

SIDNEY A. REEVE.

Witnesses:
   ADELINE C. RATIGAN,
   E. BATCHELDER.